May 20, 1947.  D. G. LORRAINE  2,420,785
VALVE
Filed Aug. 6, 1943
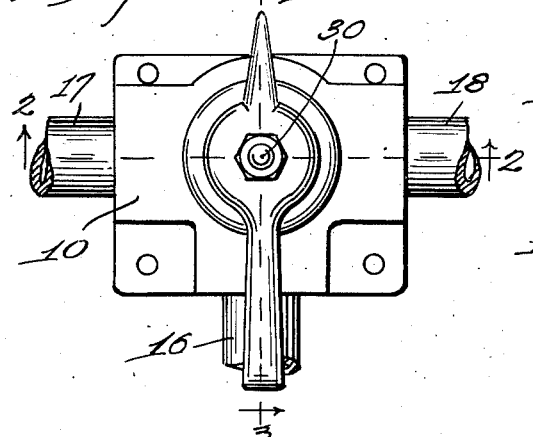
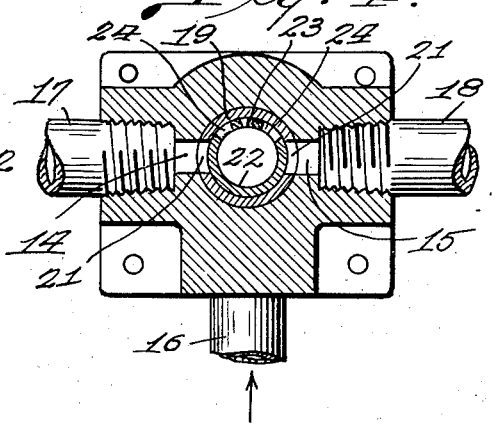
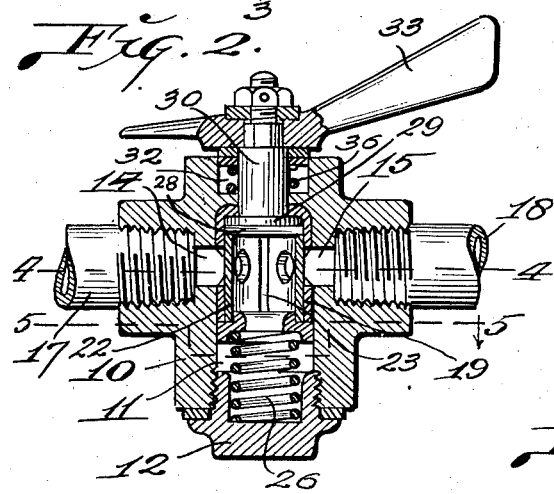
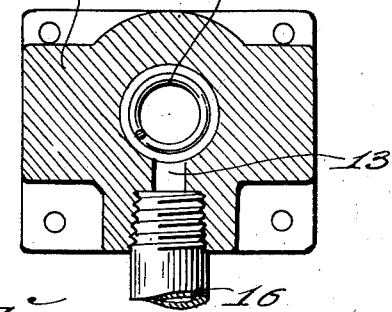
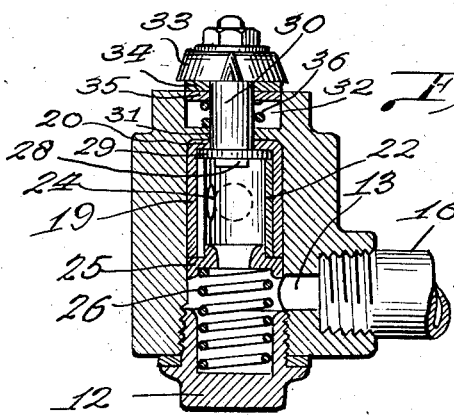
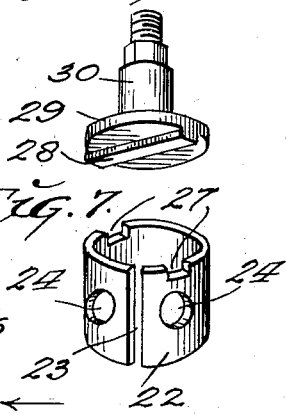
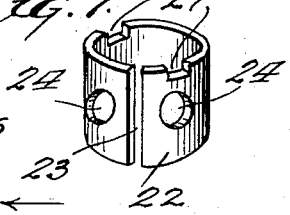
INVENTOR.
D. G. LORRAINE.
By Martin P. Smith
ATTY.

Patented May 20, 1947

2,420,785

UNITED STATES PATENT OFFICE 2,420,785

VALVE

David G. Lorraine, La Canyada, Calif., assignor of seven and one-half per cent to H. W. Elliott, Los Angeles, Calif.

Application August 6, 1943, Serial No. 497,643

6 Claims. (Cl. 251—96)

My invention relates generally to fluid flow control valves and more particularly to a valve of the three-way type and among the principal objects of my invention are, to generally improve upon and simplify the construction of the existing forms of three-way valves and to provide simple and efficient means, in the form of an expanding tubular valve and to mount same so that it may be rotated readily, even though there is a tendency of said valve to become "frozen" and stick after extended periods of rest or inaction.

Further objects of my invention are to provide a three-way valve which is especially effective in controlling the flow of fluids under relatively high pressures and further, to provide simple and efficient means for providing fluid pressure-tight joints between the rotary valve, its stem and the valve housing.

With the foregoing and other objects in view, my invention consists in certain novel features of construction and arrangement of parts that will be hereinafter more fully described and claimed and illustrated in the accompanying drawings in which:

Fig. 1 is a top plan view of a valve constructed in accordance with my invention.

Fig. 2 is a vertical section taken on the line 2—2 of Fig. 1.

Fig. 3 is a cross section taken on the line 3—3 of Fig. 1.

Fig. 4 is a horizontal section taken on the line 4—4 of Fig. 2.

Fig. 5 is a horizontal section taken on the line 5—5 of Fig. 2.

Fig. 6 is a perspective view of the valve actuating stem.

Fig. 7 is a perspective view of the expanding valve.

Fig. 8 is a perspective view of a bearing ring which is positioned beneath the valve and the surrounding liner.

Referring by numerals to the accompanying drawings which illustrate a preferred embodiment of my invention, 10 designates the valve housing having a centrally arranged valve chamber 11, the lower end thereof being closed by a recessed cap or screw plug 12.

An inlet port 13 formed through the wall of housing 10 communicates with the lower portion of chamber 11 and formed through the upper portion of said housing are oppositely arranged outlet ports 14 and 15.

A supply pipe 16 connected to the valve housing communicates with port 13 and pipes 17 and 18 connected to said housing communicate respectively with the outlet ports 14 and 15. Outlet ports 14 and 15 are disposed substantially at right angles to inlet port 13.

Rigidly seated by shrinking or otherwise, within the upper portion of valve chamber 11, is a tubular liner 19 of hard wear-resisting metal having at its upper end, a narrow inwardly presented flange 20.

Formed through the wall of liner 19 are diametrically opposite ports 21 which register with ports 14 and 15.

Arranged for rotation within the lower portion of liner 19 is a tubular valve 22 formed of resilient metal, split lengthwise as designated by 23 and the normal tendency of this valve is to expand and therefore fit snugly against the inner face of the liner 19.

Tubular valve 22 is entirely separate from and in nowise connected to liner 19.

Formed through the wall of this expanding valve on opposite sides of the split 23 are ports 24 which, as the valve is rotated, register with ports 21 in the liner and outlet ports 14 and 15.

Fitting snugly within the lower end of the valve 22, and against the lower end of liner 19 is the upper face of a bearing ring 25 and bearing against the underface thereof is the upper end of an expansive coil spring 26, the lower portion of which occupies the recess in cap 12.

Formed in the upper edge of expanding valve 22 are oppositely disposed notches 27, which receive a rib 28 that is formed on the underface of disc 29.

This disc is carried by the lower end of a rotary valve stem 30 which extends through a bearing 31 and also through a recess 32, formed in the upper portion of the valve housing and detachably mounted on the upper end of said stem, is a handle 33.

A sealed joint is provided between the stem 30 and the upper portion of the valve housing by a metal gasket 34 positioned on the stem 30 beneath handle 33, a washer 35 of rubber or the like positioned against the underface of said gasket and an expansive coil spring 36, positioned in recess 32 and bearing against the underface of said rubber washer.

The structure just described takes the place of the conventional stuffing box or gland. For highest efficiency, the rubber washer 35 should be positioned wholly within recess 37.

In the operation of my improved valve, handle 33 is actuated to rotate stem 30 and through the engagement of rib 28 in notches 27, valve 22 will be rotated so as to bring one or the other of the ports 24 into registration with one of the ports 21 and port 14, or the other port 21 and port 15 and thus fluid pressure is free to flow from supply pipe 16 through port 13, chamber 11, ring 25, thence through valve 22 and then through one of the ports 24, thence through that one of the ports 21, which is in registration with said port 24 and then through the corresponding outlet port 14 and 15 and the pipe 17 or 18 leading therefrom.

When pressure is applied to the handle 33 to rotate the valve, the latter being resilient and split lengthwise, will be contracted circumferentially to a certain degree, thus enabling it to be readily rotated even though there should be a tendency to stick, as a result of extended periods of metal to metal contact between the outer surface of the valve and the liner 19.

The contraction of the valve is due to the pressure of one end or the other of the rib 28 against the end of one of the notches 27, which pressure is transmitted to the metal in the valve between the notch and the slit 23 and which action tends to narrow said slit and thus draw a portion of the wall of the valve away from the surrounding liner.

When pressure on the handle is relieved the resiliency of metal in the valve instantly restores the latter to its normal condition.

The normal pressure exerted by spring 26, together with the pressure of the fluid in the valve bore or chamber, cooperate to act on the split valve 22 and produce fluid pressure-tight joints between said valve and the surrounding portion of the valve housing (the liner 19), also between disc 29 and the valve housing and further said combined spring and fluid pressure compensates for any wear which may develop between the split valve, its stem 30, the disc 29 and the surrounding and contacting parts of the valve housing.

As sleeve 22 is moved from one position to another, the seal is broken between the external surface of said sleeve and the surrounding face of the housing, thus preventing scoring of the contacting surfaces.

Thus it will be seen that I have provided a three way valve which is simple in construction, inexpensive of manufacture, capable of being readily taken apart and very effective in performing the functions for which it is intended.

It will be understood that minor changes in the size, form and construction of the various parts of my improved valve may be made and substituted for those herein shown and described without departing from the spirit of the invention, the scope of which is set forth in the appended claims.

I claim as my invention:

1. In a valve, a housing provided with an inlet port and a pair of outlet ports, a manually operable split tubular valve arranged for operation within said housing and provided with ports which are adapted to register with the outlet ports in said housing, a ported liner seated within said housing and surrounding said tubular valve and a spring pressed ring bearing against the ends of said valve and liner.

2. In a valve, a housing provided with an inlet port and a pair of outlet ports, an expansible resilient split sleeve arranged for operation within said housing which sleeve is provided with ports on opposite sides of the split in said valve for registering with the outlet ports in said housing, a ported liner seated in the valve housing around said split sleeve and a spring pressed ring bearing against the lower ends of said sleeve and liner.

3. A valve as set forth in claim 2 and with manually operable means for simultaneously contracting and rotating said split sleeve.

4. A valve as set forth in claim 2 and means for admitting fluid pressure to said housing and into said split sleeve so that cooperating resilience and fluid pressure is exerted on said split sleeve for sealing the joint between same and the surrounding portion of the valve housing.

5. A valve as set forth in claim 2 and with means for admitting fluid pressure to said housing and into said split sleeve so that cooperating resilience and fluid pressure is utilized to compensate for wear between said sleeve and the surrounding portion of the valve housing.

6. A valve as set forth in claim 2 with a manually operable stem, a disc carried by said stem and having driving engagement with said sleeve and means for admitting fluid pressure to said housing and into said sleeve so that cooperating resilience and fluid pressure is utilized to compensate for wear between said sleeve, stem and disc and the surrounding parts of the valve housing.

DAVID G. LORRAINE.

REFERENCES CITED

The following references are of record in the file of this patent:

UNITED STATES PATENTS

| Number | Name | Date |
| --- | --- | --- |
| 2,105,331 | Rasmussen | Jan. 11, 1938 |
| 690,232 | Chappell | Dec. 31, 1901 |
| 1,939,141 | Schultis | Dec. 12, 1933 |

FOREIGN PATENTS

| Number | Country | Date |
| --- | --- | --- |
| 284,372 | Germany | May 15, 1915 |
| 840,412 | France | Jan. 16, 1939 |